Oct. 24, 1944.    F. E. ALTMAN    2,360,822
STADIAMETRIC RANGE FINDER AND VIEWER
Filed June 4, 1943    6 Sheets-Sheet 1

FRED E. ALTMAN
INVENTOR

BY
ATT'Y & AG'T

Oct. 24, 1944. F. E. ALTMAN 2,360,822
STADIAMETRIC RANGE FINDER AND VIEWER
Filed June 4, 1943 6 Sheets-Sheet 2
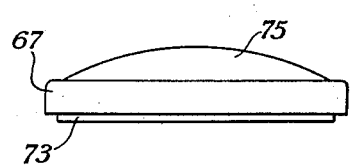
FIG. 6.
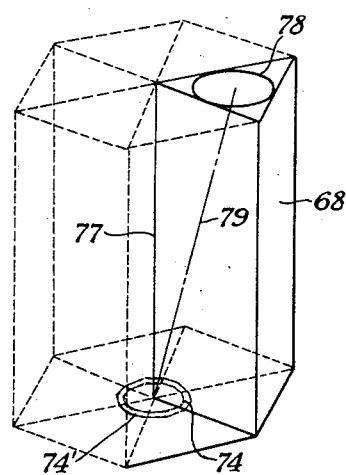
FIG. 7.
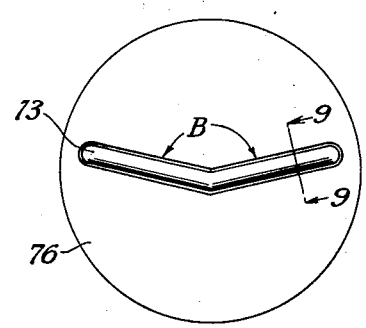
FIG. 8.
FIG. 4.
FIG. 9.
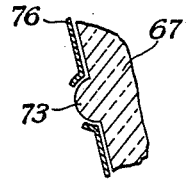
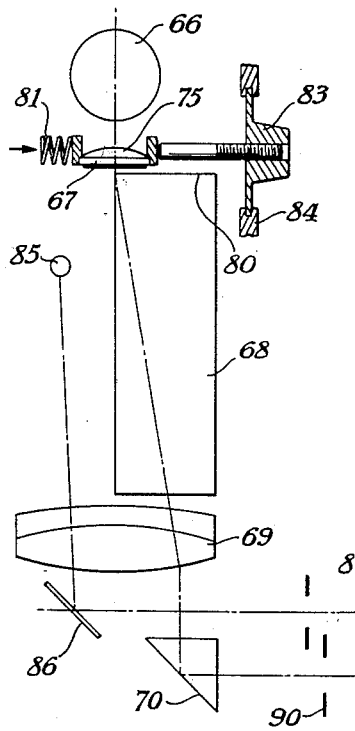
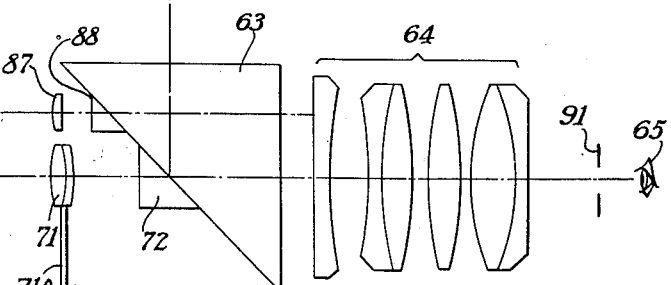
FIG. 5.
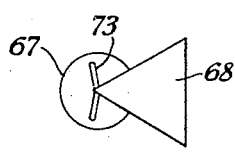
FRED E. ALTMAN
INVENTOR
BY
ATT'Y & AG'T Oct. 24, 1944.    F. E. ALTMAN    2,360,822
STADIAMETRIC RANGE FINDER AND VIEWER
Filed June 4, 1943    6 Sheets-Sheet 3
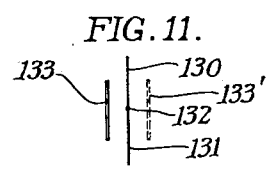
FIG. 11.
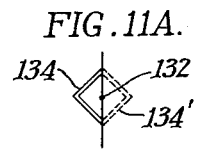
FIG. 11A.
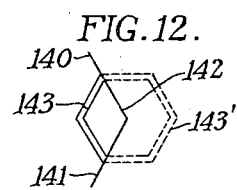
FIG. 12.
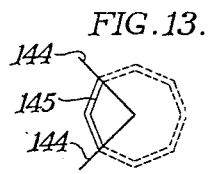
FIG. 13.
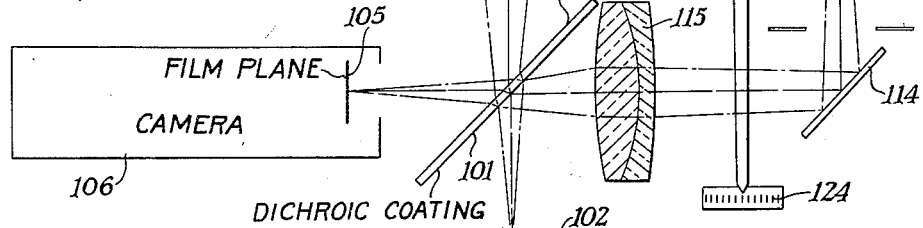
FIG. 10.
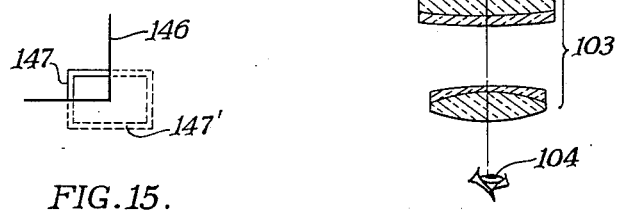
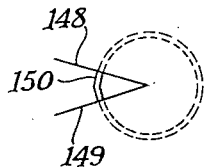
FIG. 14.
FIG. 15.
FRED E. ALTMAN
INVENTOR
BY *Newton M Perries*
*J M Emerson Holmes*
ATT'Y & AG'T

FRED E. ALTMAN
INVENTOR

Oct. 24, 1944.   F. E. ALTMAN   2,360,822
STADIAMETRIC RANGE FINDER AND VIEWER
Filed June 4, 1943   6 Sheets-Sheet 5

FRED E. ALTMAN
INVENTOR

Oct. 24, 1944.　　　F. E. ALTMAN　　　2,360,822
STADIAMETRIC RANGE FINDER AND VIEWER
Filed June 4, 1943　　　6 Sheets-Sheet 6
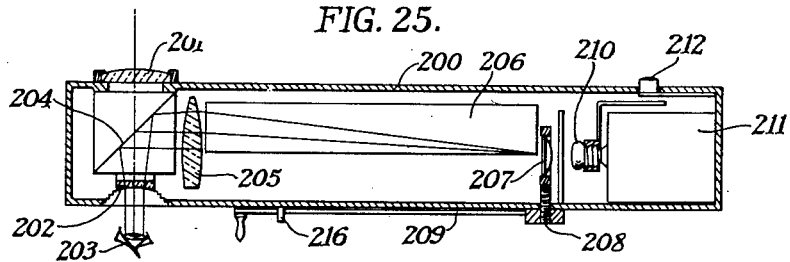
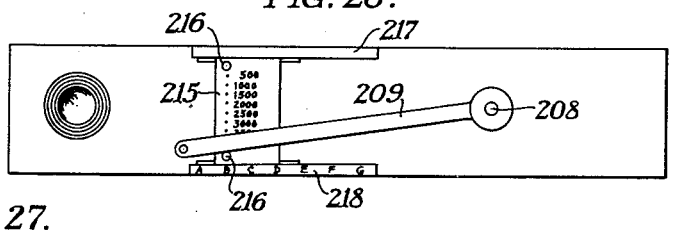
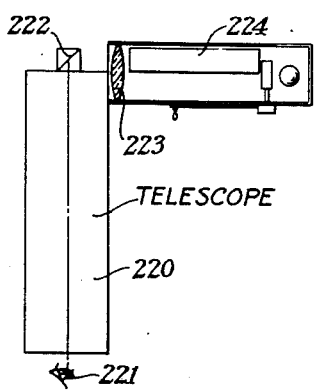
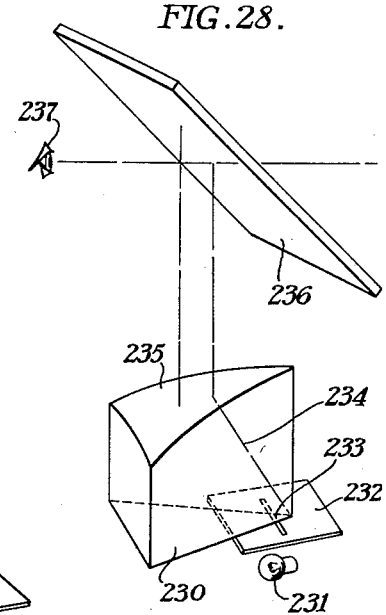
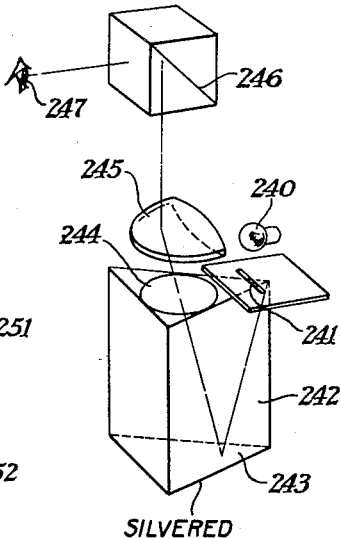
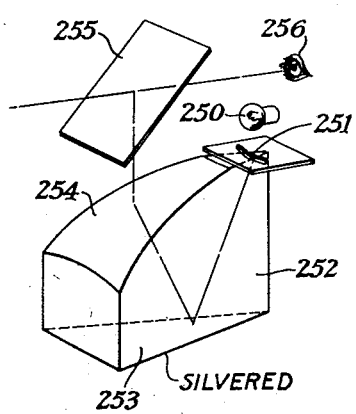
FRED E. ALTMAN
INVENTOR

UNITED STATES PATENT OFFICE 2,360,822

STADIAMETRIC RANGE FINDER AND VIEWER

Fred E. Altman, Rochester, N. Y., assignor to Eastman Kodak Company, Rochester, N. Y., a corporation of New Jersey Application June 4, 1943, Serial No. 489,644

47 Claims. (Cl. 88—2.2)

This invention relates to viewing devices such as reflex sights and stadiametric range finders. Stadiametric range finders depend on the diameter of the object being ranged for the base of the triangulation and thus for the determination of the distance to the object. Usually a pair of reticle marks or some form of cross hairs with adjustable separation is compared with or matched to the apparent diameter of the object or target. The separation of the cross hairs or reticle marks is indicative of the object range.

Objects and purposes of the invention

It is the principal object of the invention to provide a pattern to be compared with the target or object or an image thereof. Preferably the pattern is a closed figure such as a circle or something approximating a circle and a real or virtual image incorporating this pattern is formed in a comparison field for comparison with the object. This comparison field may be at the object itself or at any real or virtual image of the object such as the focal plane of the eyepiece of the instrument.

The following are objects and advantages of preferred embodiments or preferred features of the invention. It is such an object to provide a pattern which is bright, such as a bright circle of uniform brilliance and uniformly visible from all normal eye positions. An incidental object of the invention is to have such a bright pattern which does not interfere with the target or object being viewed.

It is an object of the range finder embodiments of the invention to provide a pattern of adjustable diameter which may be matched to that of the target for ranging purposes. Preferably this adjustability is provided by a structure which insures maximum stability so that the instrument will remain in true calibration even under fairly rough usage.

It is an object of the invention to provide a pattern which is centered and in effective alignment with some oldnance device. In such an embodiment, the pattern may be used as an aiming circle or in a combination of the two forms of the invention, the pattern may be used simultaneously as both an aiming circle and a ranging pattern. It is often desirable to have aiming circles whose alignment is adjustable to compensate for certain ballistic factors such as the lead of a moving target, etc. It is an object of one preferred embodiment of the invention to incorporate this feature in the pattern producing system.

Another feature of the invention consists of a combination of the main pattern producing means with an auxiliary signal system for warning the observer of any special condition such as the moment when the limit has been reached of a fire directing mechanism or such as the fact that one of the guns is or is not firing.

Reference is made to a copending application Serial No. 518,560 filed January 17, 1944, by Eagle, Orser and Dirksen combining my invention with a photographic camera for recording both the field of view and the ranging pattern.

It is an object of one preferred embodiment of my invention to provide a compact arrangement for producing the pattern in question. A copending application, Serial No. 516,923, filed January 4, 1944, by Woodson has a similar object and provides an alternative arrangement for accomplishing this compactness.

It is also an object of the invention to provide a pattern producing system of high optical efficiency.

Definitions

Although this specification borrows language freely from the arts associated with ballistics, optics in general and range finders in particular, there are a few terms which are used in an exact sense and when so used, simplify greatly the understanding of the invention and the description thereof. The use of these terms also permits avoidance of stilted language under those conditions where the English tongue would be normally strained or would normally describe a genus by all of its alternatives rather than by a single term.

"Dihedral reflecting surfaces" refers to a pair of mirrors or the sides of a prism intersecting in a line. The effect of such a pair of dihedral reflecting surfaces is well known from the operation of a kaleidoscope. The angle between these surfaces is referred to as the "dihedral angle" and the line of intersection is referred to as the "roof edge."

The element which is used to form the pattern discussed above is a straight or bent line or mark or a real or virtual linear image. This entity is referred to as the "patrix" since when acted upon optically, it generates or produces the pattern. This word patrix is to the best of my knowledge new to the field of optics but appears to be exact since it is analogous to pattern, the entity which it generates and since its root is commonly associated with the generation of something. As will be pointed out below, the patrix may be either straight or bent and if bent, is preferably geniculate since the bending comes at the middle of the patrix which in turn is in the bisecting plane of the dihedral angle.

The pattern and the object are compared in what is defined as the "comparison plane" which may be at the target itself or at an image thereof depending on which species of the invention is used. Strictly speaking, the object or target is different from a real or virtual image thereof and no word generic to these terms is commonly used. However, the term image has sometimes been employed to mean either a real or virtual image or to mean the object itself. This terminology can be justified in various ways, especially when any refractive medium at all such as a piece of glass or even the air itself comes between the object and the eye of the observer. In any case, this usage will be adopted throughout this specification and claims so that the term "image" will be generic to the object itself and real or virtual images thereof. Thus, there is always an image of the target in the comparison plane defined above.

Since some embodiments of the invention employ a relaying lens to project a real image of the patrix pattern and others employ a collimator to produce a virtual image of the pattern at infinity, the term "projecting means" is used as generic to both a relay lens and a collimator lens. The projecting means may include various lenses and/or reflectors.

The term "range indicative means" is used to describe either the normal scale of the range finder or the equivalent thereof which often consists of some mechanical or electrical coupling for introducing the range into an aiming device or calculator. This range indicative means gives a scale reading directly or some indication of the range and/or gives a mechanical indication to some aiming device.

Forms of the instrument

A viewing device according to the invention consists of means for viewing a target "image" in a comparison plane, a pair of "dihedral reflecting surfaces" whose dihedral angle is a submultiple of 360°, a patrix near one end of the roof edge of the dihedral reflecting surfaces and a projecting means such as a relaying lens or a collimator or its equivalent at the other end of the roof edge for projecting in the comparison field a real or virtual image of the pattern formed by the patrix and its kaleidoscopically generated images. In the embodiments of the invention to be used as stadiametric range finders, the patrix is movable radially with respect to the roof edge of the dihedral reflectors and range indicative means are operated by the adjustment of the distance between the patrix and the roof edge.

Each feature of this system will now be considered in turn and preferred forms thereof and preferred combinations of the features will be described in order.

Preferably the patrix moves so that the dihedral reflector and the projecting means can be rigidly mounted to provide stability which is of utmost importance in certain instruments. The patrix may be any form of mark or line but is preferably bright and formed by a linear light source such as a ribbon or closely coiled filament as in an exciter lamp, shining through a narrow cylindrical lens to form a thin bright line of light preferably positioned at the entrance end of the dihedral reflector. If the patrix is spaced slightly from the end of the dihedral reflector, the resulting pattern generated by the patrix is not a completely closed figure of the type often desirable for certain uses of the invention. For optical efficiency the patrix is preferably illuminated through some form of condenser system and this condenser is preferably molded as an aspherical surface on the same unit which constitutes the narrow cylindrical lens for forming the patrix. The light source is arranged to send light through the patrix over a sufficiently wide angle to insure uniform brilliance of all the kaleidoscopical images and hence to insure uniform brilliance of the whole pattern. When such an illumination system is conveniently included, it is often desirable to have the light source move with the patrix to maintain this proper distribution of intensity.

The dihedral reflecting surfaces are preferably the sides of a prism for several reasons. In the first place, it is easy to manufacture such a prism with an accurate and constant dihedral angle. In the second place, the reflectivity is higher than that of most mirrors and high reflectivity is necessary to maintain brightness from one of the patrix images to the next, and hence, to maintain uniformity of brightness throughout the resulting pattern. The dihedral angle is a submultiple of 360°. Conceivably the dihedral angle may be 180° so that the two reflecting surfaces are coplanar and the roof edge is just a line centrally located in the plane of the reflectors. If the patrix is a straight line, the pattern is just two parallel straight lines, the patrix and image thereof. If the patrix is bent (geniculate) at 90° to intersect the planes of the dihedral reflector symmetrically, the resulting pattern is a square. However, the preferred embodiment of the invention has the dihedral angle less than 180° and the smaller this angle, the more nearly circular is the pattern. Attention is drawn to the fact that a geniculate patrix in which the angle is 180° minus ½ of the dihedral angle, gives a symmetrical figure with twice as many sides as that formed when the patrix is a straight line and hence the geniculate patrix gives a closer approach to the ideal circular pattern. Attention is also drawn to the fact that in order to get a pattern which is a closed figure, the patrix should intersect the planes of the dihedral surfaces at equal distances from the roof edge.

This kaleidoscopically formed pattern is symmetrical about the roof edge and lies in a plane perpendicular to the roof edge. For most purposes it is desirable to have this pattern so projected into the comparison plane that it remains symmetrical, i. e. free of foreshortening or ellipticity. On the other hand, slight lack of symmetry does not interfere too greatly in some embodiments of the invention.

Except when distortion has not been removed and the pattern is off-axis, the required symmetry is inherently retained by any ordinary projection system having its optical axis parallel to the roof edge. In this case symmetry is present even in any intermediate images. The projection system often includes several parts offset from one another, but each part has its axis parallel to the roof edge. An alternative form permits the use of tilted lenses or anamorphotic lenses exactly balanced to give a final image which is symmetrical.

Whatever projecting means is used, a short roof edge in the dihedral prism produces an optical disadvantage. For example, the lenses used have to be corrected over a greater aperture or to cover a greater field or both, any anamorphotic system used must be quite strong and any residual foreshortening is accompanied by lack of sharpness of focus. However for compactness a short roof edge is often desirable. This may be accomplished directly in one embodiment of the invention by placing the patrix near the roof edge at the exit face of the dihedral prism and by having a silvered or otherwise reflecting surface on the other end of the prism. Such an arrangement is equivalent to a system employing a dihedral prism directly but of twice the length. This embodiment is described in the copending Woodson application mentioned above.

Another method of shortening the dihedral prism which has the additional advantage of giving an increased effective aperture consists of having an inclined exit face on this prism or consists of introducing a wedge to compensate for the great angle between the light beam from the patrix and the roof edge of a simple short prism. The light beam which is utilized, normally has its optic axis passing through the center of the exit face of the prism in order to use the maximum aperture of this exit face.

Even in those embodiments of the invention which employ a long dihedral prism, I have found that it is desirable to include somewhere between the patrix and the comparison plane some form of optical wedge means (such as a thin prism, an inclined exit face on the dihedral prism or an off set positive or negative lens) in order to align the optical axis of the comparison plane and the light beam from the patrix. The optical axis of the comparison plane is usually defined by the eyepiece of the instrument or possibly some image forming or relay system in the instrument. The optical wedge means is oriented with its effective apex facing away from the roof edge and is of such power that it can be considered as bending the comparison field axis so that it intersects the patrix end of the roof edge. It is noted that when a simple dihedral prism with parallel entrance and exit faces is used, the exit face cooperates with and must be considered as constituting part of whatever wedge means are introduced. In certain embodiments of the invention I prefer to use a decentered lens, i. e. one which is decentered with respect to the optical axis of the comparison plane. One species of this embodiment has the projecting means made of two positive lenses one at its focal length from the patrix and having its optical axis (decentered from that of the comparison plane) in alignment with the roof edge of the prism so that it collimates the light from the patrix and projects it in a beam substantially parallel to the roof edge. The other lens of the projecting means receives this collimated beam and focuses an image thereof in the comparison plane. This particular embodiment has many additional advantages to be described below including parallelism of the optical axis and the roof edge. Another form of the projecting means, particularly useful in a reflex sight, consists of a simple collimating lens, i. e. a lens with the patrix at its focal plane. This projecting means sends out a collimated beam so that the pattern generated by the patrix and the dihedral prism appears as a virtual image at infinity. The wedge means which consist of a sloped end to the dihedral prism is particularly useful with this collimated embodiment of the invention. Furthermore, a collimator is useful in those embodiments of the invention wherein a stadiametric range finder is made up as an attachment to go on the front of any form of telescope.

Thus the individual features and preferred foms thereof as fully described include the patrix, the dihedral reflector, the projecting means and the wedge means for optical efficiency and/or for shortening the overall lentgh of the system. The optical system as a whole is made efficient first by having the wedge means to insure a uniform distribution of light from the pattern with respect to the axis of the comparison field and second by having the condenser lens near the patrix. Of course, any system employing an eyepiece has an exit pupil which should preferably be filled with light and in certain instruments the telescope or other system for forming an image of the target usually has some stop conjugate to the exit pupil of the eyepiece. In such cases, a similar stop is preferable located in a corresponding position in the pattern forming system and the condenser lens near the patrix is preferably of such power that it just completely fills this latter stop with light from the source. The advantages of such a highly efficient optical system will be quite apparent to those familiar with precision telescopes and similar systems.

Since the calibration of the range indicator depends on the diameter of the object or target being ranged, one preferred embodiment of the invention includes means for adjusting the scale or calibration of the instrument in accordance with the target diameter as soon as the latter is known. This requires the observer to recognize the target, but as soon as he does so recognize it and sets the calibration of his instrument, the range indicative means gives the range directly and/or transmits it directly into some fire control device. The adjustor itself can be in the form of a screw, a lever or a cam, since the required movement of the patrix is quite small, but, of course, it must be quite precise.

In the embodiment of the invention in which the pattern is used for an aiming circle and the ballistic factors are corrected optically, a preferred embodiment of the invention has one or more of the elements of the projecting means displaceably laterally, the displacement being proportional to the required lead or other ballistic factor.

In certain embodiments of the invention, at least part of the projecting means (relay lens or collimator) extends beyond the region utilized for projecting the pattern image. In one preferred form of the invention this additional part of the lens system is utilized for forming in the focal plane of the eyepiece any desired auxiliary signal. An extra light source is provided to give this signal and this source can be connected for any desired automatic operation.

The following detailed description includes many preferred embodiments of the invention and the various features thereof just described. Many additional advantages will be apparent from the following description when read in connection with the accompanying drawings, in which:

Fig. 4 shows a stadiametric range finder according to a preferred form of the invention coupled to a periscope;

Fig. 5 shows one detail of Fig. 4;

Fig. 6 illustrates the kaleidoscopic effect of a prism;

Figs. 7, 8 and 9 are enlarged details of Fig. 4 showing a preferred form of patrix; in elevation, in plan and in section respectively;

Fig. 10 illustrates another embodiment of the invention;

Fig. 11 illustrates a simplified patrix cooperating with a dihedral angle of 180°; Fig. 11A is similar with the patrix bent at 90°;

Figs. 12, 13 and 15 show the effects of different dihedral angles;

Figure 21:
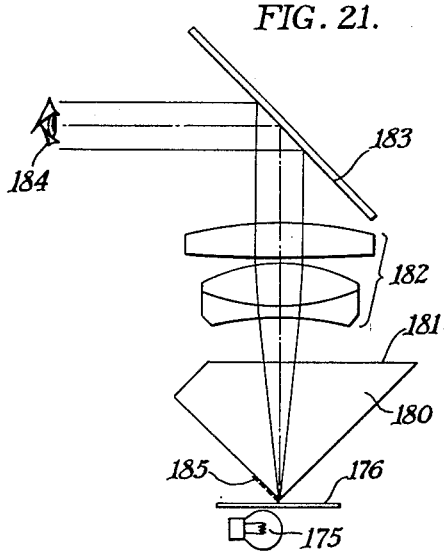
Figure 22:
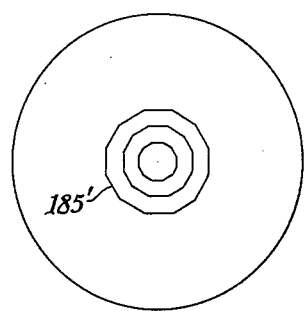
Figure 23:
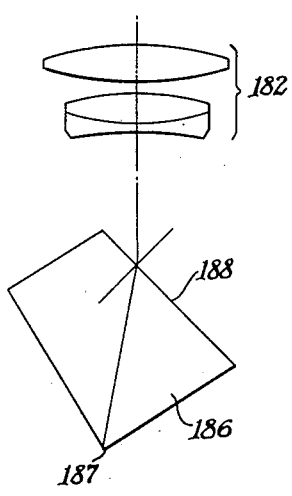
Figure 24:
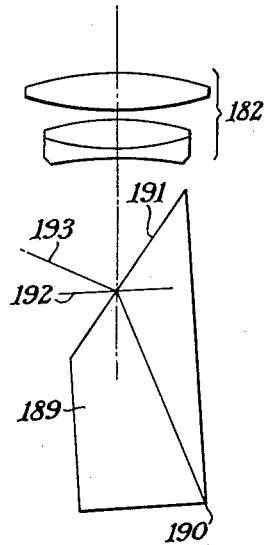

Fig. 14 similarly shows an embodiment particularly useful as a variable field view finder frame;

Figs. 16 to 20 illustrate various systems for utilizing the maximum aperture of the kaleidoscope system;

Fig. 21 illustrates a reflex sight utilizing the invention;

Fig. 22 is a view through the sight shown in Fig. 21;

Figs. 23 and 24 show the effects of prism forms alternative to that shown in Fig. 21;

Fig. 25 is a plan view of a simplified stadiametric range finder according to the invention;

Fig. 26 is a front elevation of the instrument shown in Fig. 25;

Fig. 27 illustrates how the invention may be used as an attachment for any telescope;

Fig. 28 shows a simplified efficient form of the invention;

Fig. 29 shows a form of the invention employing a short dihedral prism;

Fig. 30 shows an embodiment combining the features of Figs. 28 and 29.

Figure 1:
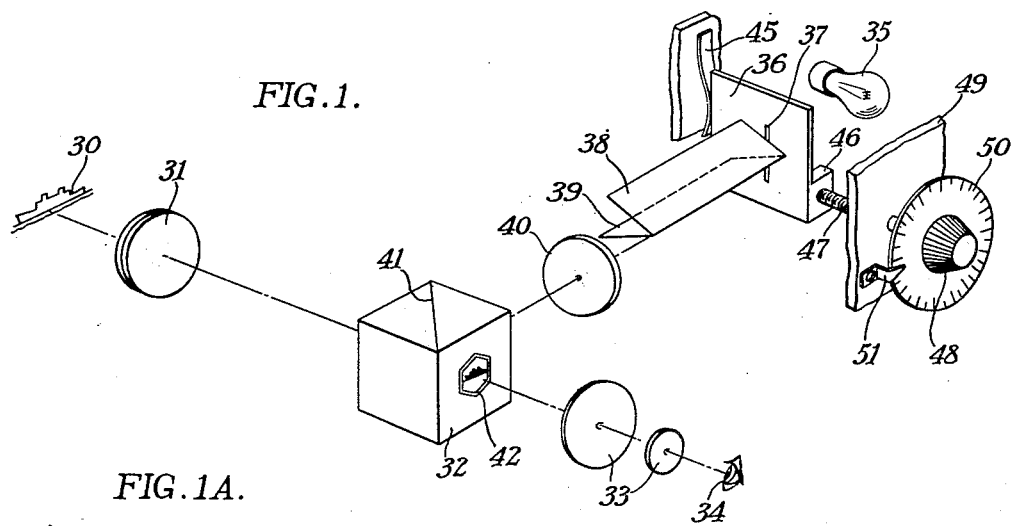
Fig. 1 is a perspective view of the optical system of a stadiametric range finder incorporating the invention.
Figure 3:
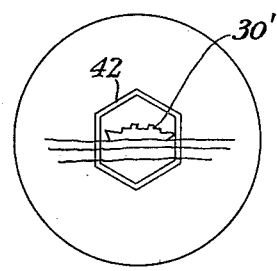
Fig. 3 is the view through the eyepiece of the instrument.

In Fig. 1 a distant object 30 sends a substantially collimated beam of light to an erector, not shown, and an objective 31 which brings it to focus in a comparison plane 32 on the surface of a beam-combining prism. This image 30', as shown in Fig. 3 may be viewed through an eyepiece 33 by the eye 34 of an observer. According to the invention, light from a lamp 35 illuminates a patrix 37 in the form of a slit in an opaque mask 36 which patrix is located near the end of the roof edge of two mirrors 38 and 39 whose dihedral angle A is 60°, which is a submultiple of 360°.

Figure 1A:
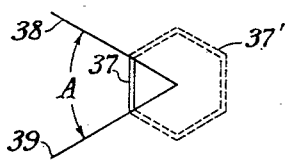
Fig. 1A shows kaleidoscopic generation of a pattern.

As seen in Fig. 1A this patrix and mirror system acts like a kaleidoscope to form a closed hexagon pattern. The light from this pattern is focused by a lens 40 and a semi-transparent surface 41 in the comparison plane 32 to form a pattern 42 to be matched with the image 30' as seen in Fig. 3.

Figure 2:
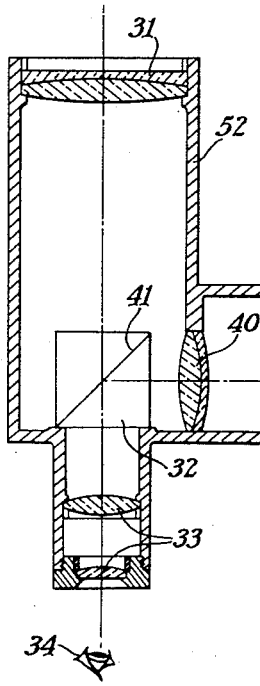
Fig. 2 is a plan view of an instrument incorporating the optical system shown in Fig. 1.
Figure 2:
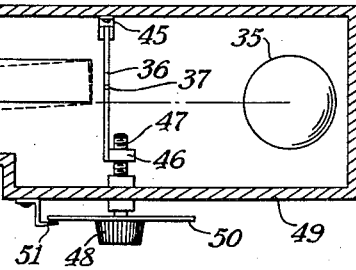

The mask 36 may be driven against the force of a spring 45 by a nut 46 and driving screw 47 operated by a knob 48 through the part 49, shown broken away in Fig. 1, of a housing 52 shown schematically in Fig. 2. If the patrix 37 moves radially with respect to the above-mentioned roof edge, the closed figure pattern 42 expands or contracts. This operation is continued until the diameter of the pattern matches that of the object image 30'. The range is then indicated by an index 51 against a scale 50 operated by the knob 48. Obviously, this range must, as is true with all stadiametric range finders, take into account the diameter of the object 30.

With the simple arrangement shown in Fig. 2, the mirrors 38 and 39 would define only a sector of the lens 40, and hence, the eye 34 would have to be positioned to one side of the optical axis in order to see the pattern 42. One simple way to overcome this and to utilize the full aperture of the dihedral mirror system is to tip the mirrors 38 and 39 and the roof edge to the position 53 shown by broken lines in Fig. 2. This introduces ellipticity into the pattern and if the patrix is spaced from the end of the dihedral system, the pattern is no longer a closed one. Other and more preferred arrangements are discussed in connection with Figs. 4, 10 and 16 to 20.

In the embodiment shown in Figs. 4 to 9 light from the object being ranged is received by a roof prism 60 in the panoramic head of a periscope and is brought to focus in the focal plane of an eyepiece objective 61. This image is relayed by a relay system 62 and a totally reflecting prism 63 to the focal plane of an eyepiece 64 through which it is viewed by the eye 65 of an observer. The dove prism of the relay system 62 is the effective stop of the periscope; the exit pupil of the eyepiece indicated by lines 91 is conjugate to this stop.

According to the invention light from a lamp 66 passes through a patrix forming system 67 which forms a bright patrix 74 on the entrance face 80 of a prism 68. Light from this patrix 74 and its images 74' is collimated by a lens 69 which is optically at its own focal length from the entrance face 80. The term "optically" is used since the index of refraction of prism 68 must be taken into account. This lens 69 has its optical axis coincident with the effective roof edge of the prism 68 so that light from the center of the patrix pattern emerges parallel to the prism edge. This preferred feature automatically eliminates ellipticity from the pattern image. This light is reflected by a prism 70 and is brought to focus by an objective 71 in the focal plane of the eyepiece 64, admission to the prism 63 being gained through a small prism 72 cemented to the hypotenuse face of the prism 63. The patrix forming means 67 is made up of a narrow cylindrical lens 73 bent at an angle B as shown in Fig. 8 and a mask 76 defining the aperture of this narrow cylindrical lens. Light from the lamp 66 is brought to focus by the narrow cylindrical lens 73 to form a line image 74, which is the patrix, bent at the angle B on the prism surface 80. The patrix forming system 67 also includes a condenser lens 75 having a parabolic rear surface of such focal length that together with the objective 69 it forms an image of the light source 66 at the plane demarked by a stop 90. The stop 90 is optically at the same distance from the focal plane of the eyepiece 64 as is the aperture stop of the viewing system which occurs in the relay system 62. This stop 90 is reimaged by the objective 71 and the eyepiece 64 in the exit pupil 91 of the eyepiece. The patrix forming means 67 is preferably made of a single pressing or molding and the mask 76 is preferably painted thereon.

If the dihedral angle of the reflecting surfaces of the prism 68 is defined as A, the angle B should equal 180°—A/2. Thus, when the dihedral angle is 60°, the angle B should be 150° and the resulting pattern made up of patrix 74 and images 74' as shown in Fig. 6 is 12 sided.

In Fig. 6 the dihedral prism 68 is shown together with its counterparts relative to the roof edge 77. The patrix 74 and its kaleidoscopically generated images 74' constitutes the required pattern. In order to utilize the maximum aperture of the exit face of the prism, the effective beam is the one from the pattern through the central area 78 of this face. The axis 79 of this beam is refracted as shown at the exit face and therefore the lens 69 of Fig. 4 is centered on the roof edge, so that light emerging from lens 69 is both collimated and effectively parallel to the roof edge. That is, the axis 79 becomes the axis of the comparison plane and eyepiece 64. With this arrangement the pattern image is free of ellipticity but it would not be if viewed directly along ray 79 as it emerges from the prism, the latter ellipticity being that due to the obliquity of the pattern to the line of sight. Having the pattern centered on the comparison plane permits the instrument to be used both for aiming and for ranging.

With this particular arrangement, less than ⅙ of the area of the lens 69 is utilized. At least part of the rest of the lens is useful for introducing any required signal into the field of view of the observer. To do this a lamp 85 connected to give the desired signal sends light through the lens 69 which is reflected by a mirror 86 and brought to focus by a lens 87 through a prism 88 cemented to the reflecting surface of the prism 63, in the focal plane of the eyepiece 64. The lamp 85 is flashed on whenever it is necessary to send the signal to the observer 65.

In Fig. 10 light from the object being viewed and ranged is brought to focus by an objective 100 in the focal plane 102 of an eyepiece 103 located in front of the eye 104 of an observer. By means of a semi-transparent mirror 101 having a non-reflecting coating on one surface to prevent front surface reflection, part of this light is side-tracked to the film plane 105 of a camera 106 so that a permanent record of the view may be kept.

According to the invention, light from a lamp 110 passes through a patrix forming device 111 similar to the pressing 67 shown in Fig. 4 and through a kaleidoscope type prism 112. An off-centered or decentered negative lens 113 deviates this beam along the optic axis of the comparison plane 102 and also diverges it. This light is reflected by a mirror 114 through a positive lens 115 which brings it to focus in the image plane 102. By proper selection of the powers and positions of the lenses 113 and 115 the resulting pattern in the plane 102 may have any reasonably desired magnification.

To vary the diameter of the pattern, the source 110 and the patrix forming means 111 are carried in a housing 120 mounted for transverse movement which is provided through a link 121 by a lever 122 pivoted at the point 123. The setting of the patrix may be read by a scale 124.

The complete combination permitting both the viewing and the photographic recording of both the object and the expanding pattern is greatly enhanced by the invention of Eagle, Orser and Dirksen which involves the use of a dichroic coating transmitting yellow and reflecting the complementary blue. In the field of view 102, one usually has plenty of light from the object being ranged and with this dichroic coating 101, this light is filtered to appear a yellow. This results in the least disturbing appearance of the object. Superimposed on this image is a blue figure formed from the mark. The mark thus appears quite bright but not sufficiently to interfere with the appearance of the object image. On the other hand, the light arriving at the film plane 105 is blue for the object and yellow for the stadiametric pattern so that the object records densely and the stadiametric ring is not sufficiently intense to fog the film, particularly when blue-sensitive film is used.

In Fig. 11 the two deflecting surfaces 130 and 131 are coplanar and thus the angle of intersection is 180°, the line of intersection being indicated by the point 132. If a straight line 133 is used as the mark, this line 133 and its image 133' are at a variable distance from each other, but the closed figure type of stadiametric range finder is always preferable to the simple two-line system. Such a closed figure may be provided with coplanar reflecting surfaces by having the mark 134 bent at an angle of 90° and thus forming a closed figure with its image 134' as shown in Fig. 11A.

In Fig. 12 the reflecting surfaces 140 and 141 intersection at the point 142 form a dihedral angle of 120°. A patrix 143 bent also at 120° forms a six-sided pattern with its images 143'. In Fig. 13 reflecting surfaces 144 are at an angle of 90° so that a bent patrix 145 forms an eight-sided figure with its images. Similarly, in Fig. 15 the reflecting surfaces 148 and 149 are at an angle of 30° which cooperate with a bent patrix 150 to give a figure which is practically a circle. However, the effective aperture of reflecting surfaces at such a small angle is unnecessarily small since the twelve-sided figure obtained with a bent patrix and a 60° dihedral angle is for all practical purposes sufficient approximation to a circle.

Fig. 14 is similar to Fig. 13, in that the dihedral angle between reflectors 146 is 90°. However, in Fig. 14 the patrix 147 is bent at an angle of 90° so that the resulting pattern 147 plus 147' is a rectangle. The motion of the patrix relative to the roof edge is preferably along the diagonal of the rectangle if the relative dimensions thereof are to be maintained for all sizes. This embodiment is particularly useful in camera view finders which are adjustable to match different focal length lenses. Such an arrangement is particularly useful in the forms of the invention shown in Figs. 21 to 26 and 28 to 30.

Figure 16:
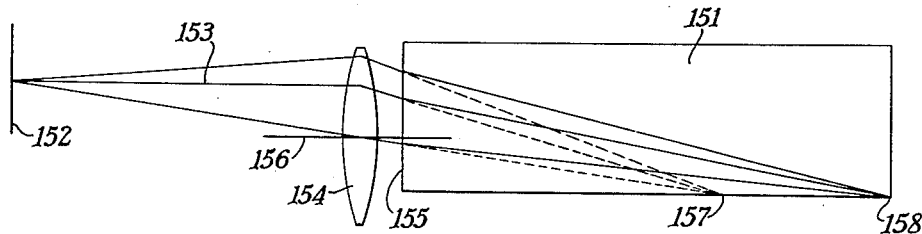

In Fig. 16, prism 151 is positioned so that the center of its exit face 155 is aligned with the optic axis 153 of a comparison plane 152. Due to the index of refraction of the prism 151 the center of the patrix at the end 158 of the line of intersection or roof edge of the reflecting surface, may be considered to be at the point 157. Light from this patrix is deviated as shown in the figure by having the objective lens 154 offset from the optic axis 153. In fact, the optic axis 156 of the lens 154 is offset just sufficiently that the lens 154 deviates the optic axis 153 toward the point 157. Due to refraction at the exit face 155 this axis is further deviated so that it strikes the point 158. The offset lens 154 and the exit face 155 thus cooperate to deviate the beam to give maximum efficiency. The resulting pattern image may contain slight ellipticity but for many purposes this is not objectionable.

Figure 17:
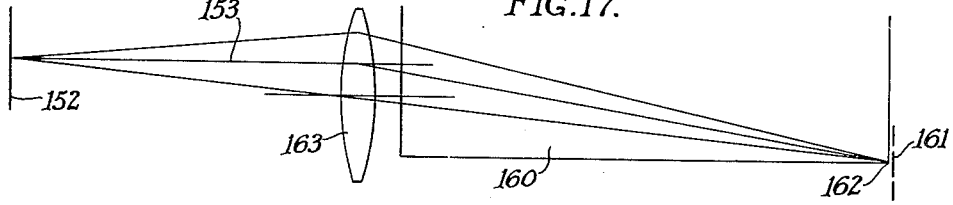

In Fig. 17 the prism 151 is replaced by a pair of mirrors 160 so that the effect of the exit face is removed. In this case, the lens 163 is offset sufficiently to deviate the axis 153 straight toward the end 162 of the roof edge of the mirrors. The patrix is indicated by a broken line 161.

Figure 18:
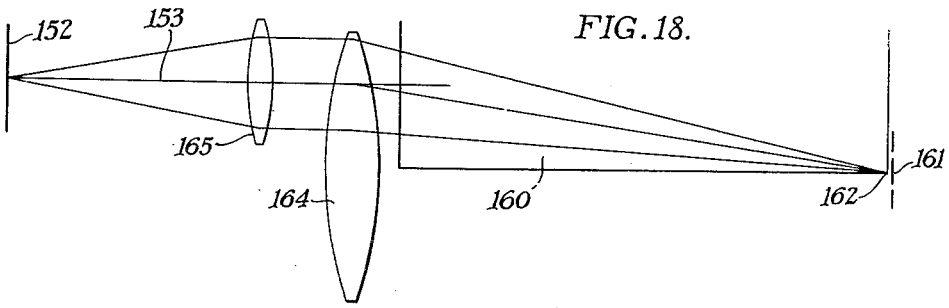

In Fig. 18 which illustrates the principle of Fig. 4, a large lens 164 has its optic axis on the roof edge of the mirrors and is located at its own focal length from the point 162. Thus, light from the point 162 is collimated and requires refocusing by an auxiliary lens 165 centered on the optic axis 153 of the comparison plane 152.

Figure 19:
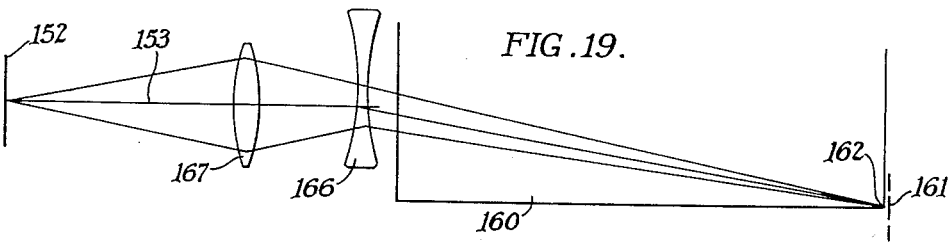

In Fig. 19 a negative lens 166 receives the light from the point 162 and is decentered in the opposite direction so that it deviates the optic axis 153 to the point 162. This negative lens cooperates with the positive lens 167 to give the desired image of the desired magnification in the comparison plane 152. If the required magnification were such that the negative lens should follow the positive lens, the resulting system would be very similar to that shown in Fig. 17 with a concentric negative lens added in the converging beam.

Figure 20:
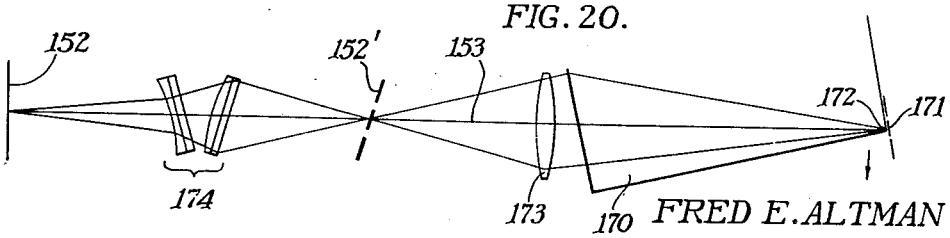

In Fig. 20 the mirror system 170 is tipped so that the projection system consisting of lens 173 may remain centered on the optic axis 153. If the patrix 171 were to move relative to the point 172 at the end of the roof edge, it would tend to go out of focus especially if a prism constituted the reflecting surfaces. At least some advantage in this connection may be gained by rotating the roof edge and the point 172 about the lens 173 or by moving the whole unit transversely as indicated by an arrow near the point 172.

With this tilted relationship between the optical axis of the lens 173 and the patrix pattern at 171, the first image 152' formed is tilted and appears foreshortened or elliptical when viewed axially. An anamorphotic lens 174 having elements with cylindrical power and tilted slightly (the tilt is exaggerated in the drawings) relays the image 152' into the plane 152, in sharp focus in that plane and free of ellipticity.

In Fig. 21 a reflex sight having its comparison plane at the object itself includes a light source 175 and a diffusing screen 176 for illuminating a series of marks constituting the patrix 185 (which as shown in Fig. 22 eventually form a series of concentric closed figures 185'). Light from this patrix passes through a prism 180, the exit face 181 of which slopes at an acute angle to the edge of the prism which constitutes the roof edge. With this particular arrangement, the exit face has no deviating effect on the light which is then collimated by a high aperture objective 182 to strike a semi-reflecting surface 183 whereat it is reflected to the eye 184 of an observer. The light appears to come from infinity and to remain fixed with respect to the distant object even when the head of the observer is moved around. The reflector 183 preferably consists of a single piece of glass or of a dichroic reflector.

Fig. 23 differs from Fig. 21 by having slightly less bevel on the exit face 188 of the reflecting prism 186. As before this exit face 188 deviates the optic axis of the comparison plane to the point 187 at the end of the prism edge.

Fig. 24 on the other hand has greater slope to the exit face 191 of the prism 189 so that light from the point 190 is deviated along the required optic axis. Broken lines 192 and 193 are included to indicate the direction the ray from the point 190 would take if the exit face of the prism were flat as shown by line 192. Of course, this deviation is small if a long prism is used, and hence, the sloped prism end is most useful in reflex sights where space is at a premium. All such simple systems introduce ellipticity (which may be removed by the use of an anamorphotic lens) and depend on depth of focus to give a clear pattern image.

The invention is useful in reflex sights whether or not the beveled prism is used. In fact even with fixed non-expanding pattern it has an important advantage over simple reflex sights which normally have such high aperture collimators that it is difficult to illuminate the reticle adequately to utilize this high aperture. The present invention retains the main advantage of this high aperture which permits great latitude in eye position and yet the present reticle requires only a relatively narrow cone of illuminating light. The longer the dihedral prism the narrower is the required cone of illumination, but if this cone is too small a negative lens may be required between the prism and the collimator in order to take advantage of the wide exit pupil of the system.

In Fig. 25 a simplified stadiametric range finder is incorporated in a small unit having a housing 200. The object is viewed through a Galilean telescope consisting of elements 201 and 202 by the eye 203 of an observer. This Galilean telescope forms a virtual image of the object being ranged. The stadiametric figure is provided by a semi-reflecting surface 204, an offset objective 205, a prism 206 and a transilluminated patrix 207. The patrix is adjustable by a screw 208 driven by rotation by a long lever 209 mounted on the outside of the housing 200. The patrix is illuminated by a flashlight lamp 210 connected through a switch 212 to a flashlight battery 211.

The scale for the instrument is carried on a sliding member 215 which may be moved by knobs 216 along tracks 217. The lower of these two tracks carries indicia to correspond to the diameter of the object being ranged. For example, when a certain aeroplane approaches the observer which he recognizes, he sets the scale 215 opposite the corresponding mark on the track 218, for example, opposite the mark D and the scale 215 is known to give the correct range.

In Fig. 27 an attachment for any telescope is shown. Light arriving at any telescope 220 is collimated when it arrives but is brought to focus to form either a real or virtual image and then substantially recollimated before being sent to the eye 221 of an observer. According to this embodiment of the invention, an attachment is provided consisting of a small and/or semi-transparent reflector 222 to be positioned in front of the telescope and a kaleidoscope range finder of the type described above which has its projection lens 223 at its own focal distance from the patrix so that light from the attachment 224 is collimated when entering the reflector 222 and the telescope 220.

In Fig. 28 light from a lamp 231 illuminates a patrix 233 in the form of a slit in a mask 232. This light enters a prismatic unit 230 and a pattern is formed kaleidoscopically as before. The exit face 235 of this prism 230 is itself a sector of a collimating lens. The lens has its optic axis on the roof edge of the prism 230 so that the light emerging from the prism unit is collimated and is deviated as shown by the ray 234, into alignment with the optic axis of the viewing system which in this case consists merely of a semi-transparent reflector 236. The collimated beam is reflected to the eye 237 of an observer so as to give a virtual image of the pattern at infinity, i. e. adjacent to the object seen through the semi-transparent reflector 236. The whole unit 230 is preferably made of a single pressing or molding of plastic or glass. The exit face 235, when molded, may readily have any desired contour and is preferably a paraboloid or some aspheric shape to correct the various aberrations which are inherent in a single surface lens system.

In Fig. 29, an embodiment of my invention, described in the Woodson application mentioned above, permits the overall length of the dihedral prism to be ½ its effective length. It will be noted by reference back to Fig. 6 for example that the patrix utilizes only that portion of the entrance face near the roof edge, whereas the outgoing beam avoids the corresponding section of the exit face. In Fig. 29 a dihedral prism 242 is cut in half and one end face 243 thereof is silvered. A patrix 241 illuminated by a lamp 240, is positioned near the other end of the roof edge. A light beam from this patrix (and the rest of the pattern generated by the dihedral reflector) passes directly through the prism 242 and is reflected by the surface 243 back through the upper end 244 of the prism. However, it avoids that part of the surface 244 which is utilized by the patrix 241. Such an arrangement is useful in any forms of the invention whether the projecting means is a relaying lens or a collimating lens.

In Fig. 29 it is shown with a collimating lens 245, the unused portion of which has been cut away to leave room for the lamp 240 and patrix 241. This half lens 245 collimates the pattern beam which is then reflected by a semi-transparent reflector 246 to the eye 247 of an observer.

Fig. 30 shows the combination of the two features shown in Figs. 28 and 29. Light from a lamp 250 passes through a geniculate patrix 251 into a prism unit 252. This light is reflected by a silver end surface 253 of the prism unit, back through a aspheric collimating surface 254 which collimates the light and deviates it to a semi-transparent reflector 255 which in turn reflects it to the eye 256 of an observer. Any of the collimating systems are of course equivalent to part of the relay system shown in Fig. 4. Therefore, any of the units shown in Figs. 28 to 30 may be utilized directly with additional objectives (such as 71 in Fig. 4) in a relay image system. On the other hand, similar systems may be made up in which the exit face of the prism alone or with some auxiliary lens constitutes a relay lens.

In any of the above forms of the invention any ballistic factor such as the lead on a moving target, is introduced by lateral adjustment of one or more of the lenses or reflectors in the projecting means such as the relay lens or the collimating lens. In Fig. 4, for example, lateral adjustment of the lens 71 (or prism 70) may be provided by direct coupling 71A to mechanism 71B operated in accordance with the lead on a moving target. If other ballistic factors such as range are required, the objective 71 may be made up of a plurality of positive lenses, separately operable in accordance with the various required ballistic factors or both the lens 71 and the prism 70 are so adjustable. This lateral adjustment of one or more optical elements shifts the pattern image in the comparison plane to correct the aim.

In any of the above embodiments the lamp is preferably a prefocused one such as used as an exciter lamp with a single ribbon filament positioned with the filament quite close to the condenser astigmatizer which was described as 67 in detail in connection with Figs. 7 to 9. Preferably the lamp house together with the condenser astigmatizer is moved transversely across the axis of the prism in a tongue and groove arrangement or the equivalent. In each case, the prism is much preferable to mirrors since there is total internal reflection and greater permanency and sharpness of the angle of intersection of the surfaces and also greater ease in the mounting of a prism.

The following comments are for those interested in the utilization of each element of the system at maximum efficiency. The provision of a fixed exit pupil for the system was described above in connection wtih Fig. 4. The diameter of the exit pupil determines the working aperture of the eyepiece. The maximum pattern to be provided in the range finder determines a certain angle which in turn determines the size of prism and the degree of patrix movement required. For example, if the maximum pattern diameter to be provided in the range finder subtends an angle whose tangent is given, the minimum prism size is known since the exit pupil of the kaleidoscope system is given by the optical system involved. Therefore, this exit face should be ample to circumscribe the greatest useful oblique beam at the greatest possible obliquity. This in turn determines what aperture the relay lens is working at, and hence, the efficiency of the system can be computed directly by anyone interested in such details which, of course, need not be known for the simple operation of the invention but are usually determined when building a precise instrument.

Having thus described the preferred embodiment of my invention, I wish to point out that it is not limited to these structures but is of the scope of the appended claims.

What I claim and desire to secure by Letters Patent of the United States is:

1. A viewing device comprising means for viewing in a comparison plane an image of a target, a pair of reflecting surfaces intersecting to form a roof edge at an angle which is a submultiple of 360°, a linear patrix near one end of the roof edge intersecting the planes of both reflecting surfaces which together with images thereof in the reflecting surfaces forms a substantially closed pattern, and means at the other end of said roof edge for projecting in the comparison plane a comparison image of said pattern.

2. A viewing device comprising means for viewing in a comparison plane an image of a target, a dihedral reflector intersecting to form a roof edge with a dihedral angle which is a submultiple of 360° and is less than 180°, a patrix near one end of the roof edge intersecting the planes of the dihedral reflector at equal distances from the roof edge to form with its images in the reflector, a substantially closed pattern and means for projecting in the comparison plane a comparison image of said pattern.

3. A viewing device according to claim 2 in which the patrix is bright on a dark background, is transparent and is transilluminated.

4. A viewing device according to claim 2 in which the patrix consists of a plurality of linear elements spaced different distances from the roof edge to form concentric closed patterns.

5. A viewing device according to claim 2 in which the patrix is geniculate at an angle about 180° minus half the dihedral angle.

6. A viewing device according to claim 2 in which the dihedral angle is 90° and the patrix is bent at 90° to give a rectangular pattern whereby a rectangular area of the comparison plane is delineated.

7. A viewing device according to claim 2 in which the patrix is a line of light formed by a transilluminated narrow cylindrical lens.

8. A viewing device according to claim 2 in which the patrix is adjustable radially with respect to the roof edge to give a pattern of variable diameter.

9. A viewing device according to claim 2 in which the patrix is a thin line of light formed by a transilluminated narrow cylindrical lens and in which the lens together with its source of illumination moves radially relative to the roof edge to give a pattern of variable diameter.

10. A viewing device according to claim 2 in which the dihedral reflector consists of faces of a triangular prism.

11. A viewing device according to claim 2 in which the dihedral reflector consists of faces of an equi-lateral prism.

12. A viewing device according to claim 2 in which the dihedral angle is between 44° and 91°.

13. A viewing device according to claim 2 in which the dihedral angle and the projecting means are formed in a single prismatic unit having side faces constituting the dihedral reflector and a convex exit end face.

14. A viewing device according to claim 2 in which the projecting means is at the end of the roof edge opposite to the patrix end.

15. A viewing device according to claim 2 in which the projecting means is a collimator.

16. A viewing device according to claim 2 in which the projecting means is a collimator whose optical axis coincides with the roof edge of the dihedral reflector.

17. A viewing device according to claim 2 in which the projecting means includes a collimator and semi-transparent reflector to combine the collimated light beam from said collimator and the light beam from the target being viewed.

18. A viewing device according to claim 2 in which the viewing device includes an objective for forming a real image of the target and the projecting means consists of a relay lens for forming in the same plane as the target image, a real image of the pattern.

19. A viewing device according to claim 2 including means for forming a real image of the target in the comparison plane, an eyepiece for viewing the comparison plane, the image forming system having an effective stop at an optical distance from the comparison plane conjugate to the exit pupil of the eyepiece and in which the projecting means consists of a relay lens for forming in the comparison plane an image of the pattern, the patrix is bright, transparent and transilluminated and a condenser lens is included near the patrix to concentrate light in the plane of the projecting means corresponding to the effective stop of the target image forming means.

20. A viewing device according to claim 2 in which the projecting means includes at least one offset lens component for deviating the optical axis of the comparison plane to the patrix end of the roof edge.

21. A viewing device according to claim 2 in which the projecting means includes optical wedge means with the apex of the wedge facing away from the roof edge to receive, and to decrease the divergence relative to the roof edge of, light from the pattern.

22. A viewing device according to claim 2 in which the dihedral reflector is a prism whose exit face is sloped at an acute angle to the roof edge.

23. A viewing device according to claim 2 in which means are included for moving the pattern image transversely relative to the target image in accordance with a ballistic factor.

24. A viewing device according to claim 2 in which the projecting means includes a transversely moving element for adjusting the pattern image relative to the target image in accordance with a ballistic factor.

25. A viewing device according to claim 2 in which the projecting means includes at least one lens extending beyond the exit aperture of the dihedral reflector and in which a light source operable in accordance with an auxiliary signal sends light through the extra portion of said lens effectively to the comparison plane.

26. A stadiametric range finder comprising means for viewing in a comparison plane an image of the target to be ranged, a pair of reflecting surfaces intersecting to form a roof edge at a dihedral angle which is a submultiple of 360° and which is less than 180°, a patrix near one end of the roof edge and laterally offset therefrom a variable distance to form with its images in the reflecting surfaces a substantially closed pattern of variable diameter, means for projecting in the comparison plane a comparison image of said pattern, means for moving the patrix radially with respect to said roof edge and range indicative means operated by said moving means.

27. A range finder according to claim 26 in which the patrix is bright, transparent and transilluminated.

28. A range finder according to claim 26 in which the patrix is geniculate at an angle approximately equal to 180° minus half the dihedral angle.

29. A range finder according to claim 26 in which the patrix is a thin line of light substantially at the entrance of the dihedral reflecting surfaces, formed by a transilluminated narrow cylindrical lens.

30. A range finder according to claim 26 in which the patrix is a thin line of light substantially at the entrance of the dihedral reflecting surfaces, formed by a transilluminated narrow cylindrical lens and a source behind the lens providing the illumination and in which the lens and the source move together relative to the roof edge to give the movement of the patrix.

31. A range finder according to claim 26 in which the dihedral reflector consists of the sides of a prism.

32. A range finder according to claim 26 in which the dihedral reflector consists of the sides of an equilateral prism.

33. A range finder according to claim 26 in which the dihedral angle is between 44° and 91°.

34. A range finder according to claim 26 in which the projecting means includes a positive lens concentric with the roof edge and optically at its focal length from the patrix.

35. A range finder according to claim 26 in which is included means for forming a real image of the target to be ranged in the comparison plane, an eyepiece for viewing the comparison plane, the target image forming means including an effective stop conjugate to the exit pupil of the eyepiece, and in which the projecting means includes a relay lens for forming in the comparison plane a real image of the pattern, the patrix is transilluminated, a condenser lens is included near the patrix for concentrating light in the plane of the projecting means which corresponds to the stop of the target image forming means and is optically at the same distance from the eyepiece.

36. A range finder according to claim 26 in which the projecting means includes at least one lens component offset to deviate the optic axis of the eyepiece to the center of the pattern at the plane of the patrix.

37. A range finder according to claim 26 in which the projecting means includes wedge means with the apex of the wedge facing away from the roof edge to receive, and to decrease the divergence relative to the roof edge, of light from the closed figure.

38. A range finder according to claim 26 in which means are included for offsetting the pattern relative to the target image in accordance with a ballistic factor.

39. A range finder according to claim 26 in which the projecting means includes at least one element transversely adjustable in accordance with a ballistic factor.

40. A range finder according to claim 26 in which the projecting means includes at least one lens extending beyond the exit aperture of the dihedral reflector and in which a light source operable in accordance with an auxiliary signal sends light through the extra portion of said lens effectively to the comparison plane.

41. A range finder according to claim 26 in which means are included for adjusting the calibration of the range indicative means in accordance with the diameter of the target being ranged.

42. A view finder comprising means for viewing an image of a target in a comparison plane, a triangular prism having a pair of reflecting surfaces intersecting to form a roof edge at a dihedral angle which is a submultiple of 360° and having auxiliary end faces orthogonal to the roof edge, a patrix consisting of a line of light formed by a transilluminated narrow cylindrical lens, said patrix being substantially on one of said end faces and laterally offset from the roof edge to form with its images in the reflecting surfaces a substantially closed pattern, a collimating lens concentric with the roof edge and effectively at its focal length from the patrix for receiving light from the pattern and collimating it in alignment with the roof edge, a positive lens at its own focal length from and in alignment with the comparison plane for receiving said collimated beam and for forming in the comparison plane a comparison image of said pattern and an eyepiece for viewing the comparison plane.

43. A view finder according to claim 42 including an optical system for forming in said comparison plane a real image of the target and including an optical stop, the exit pupil of the eyepiece being conjugate to said stop and in which there is located between the collimating lens and said positive lens an optical stop also conjugate to the eyepiece exit pupil and further in which the narrow cylindrical patrix lens is illuminated by a source of light and through a condenser for forming an image of said source substantially in the plane of the last mentioned stop.

44. A view finder according to claim 42 in which means are included for moving the patrix forming means and hence the patrix, radially relative to the roof edge for varying the diameter of said closed pattern and range indicative means are operated by said moving means.

45. A view finder according to claim 42 in which means are included for moving the patrix forming means and hence the patrix, radially relative to the roof edge for varying the diameter of said closed pattern and range indicative means are operated by said moving means and in which means are included for adjusting the calibration of the range indicative means in accordance with the diameter of the target.

46. A view finder according to claim 42 in which said positive lens is laterally adjustable in accordance with a ballistic factor.

47. A view finder according to claim 42 in which said collimator lens extends beyond the roof edge and signal light is positioned to one side of the prism for sending light through the extending portion of the collimator lens, to the comparison plane.

FRED E. ALTMAN.